United States Patent
Weiss et al.

(10) Patent No.: US 12,152,974 B2
(45) Date of Patent: Nov. 26, 2024

(54) METHOD FOR DETERMINING THE PARTICLE SIZE DISTRIBUTION OF AN AEROSOL AND AEROSOL MEASURING DEVICE

(71) Applicant: Palas GmbH Partikel- und Lasermesstechnik, Karlsruhe (DE)

(72) Inventors: Maximilian Weiss, Weingarten Baden-Württemberg (DE); Frederik Weis, Karlsruhe Baden-Württemberg (DE); Ann-Kathrin Gossmann, Karlsruhe Baden-Württemberg (DE)

(73) Assignee: Palas GmbH Partikel- und Lasermesstechnik, Karlsruhe (DE)

( * ) Notice: Subject to any disclaimer, the term of this patent is extended or adjusted under 35 U.S.C. 154(b) by 369 days.

(21) Appl. No.: 17/613,383

(22) PCT Filed: May 25, 2020

(86) PCT No.: PCT/EP2020/064419
§ 371 (c)(1),
(2) Date: Nov. 22, 2021

(87) PCT Pub. No.: WO2020/239679
PCT Pub. Date: Dec. 3, 2020

(65) Prior Publication Data
US 2022/0221389 A1    Jul. 14, 2022

(30) Foreign Application Priority Data
May 27, 2019   (DE) .................. 10 2019 003 704.9

(51) Int. Cl.
*G01N 15/02*      (2024.01)
*G01N 15/0205*    (2024.01)
*G01N 15/00*      (2006.01)

(52) U.S. Cl.
CPC . *G01N 15/0211* (2013.01); *G01N 2015/0046* (2013.01)

(58) Field of Classification Search
CPC .... G01N 15/1459; G01N 15/075; G01N 5/02; G01N 5/0211; G01N 5/06; G01N 5/1425;
(Continued)

(56) References Cited

U.S. PATENT DOCUMENTS 3,901,602 A * 8/1975 Gravatt, Jr. ............ G01N 21/53
356/439
5,438,408 A    8/1995 Weichert et al.
(Continued)

FOREIGN PATENT DOCUMENTS

CN    105651662 A    6/2016
CN    106092841 A    11/2016
(Continued)

OTHER PUBLICATIONS

J. B. Liley, Fitting Size Distributions to Optical Particle Counter Data, Aerosol Science and Technology, 1992, pp. 84-92, vol. 17, No. 2 (10 pages).
(Continued)

*Primary Examiner* — Hoa Q Pham
(74) *Attorney, Agent, or Firm* — FLYNN THIEL, P.C.

(57) ABSTRACT

The invention relates to a method for determining the particle size distribution of an aerosol by means of an aerosol measuring device and to an aerosol measuring device. Aerosol particles of the aerosol flowing through the measuring cell are illuminated in the measuring cell by a light beam. The scattered light is picked up by a detector, so that light signals of the aerosol particles can be detected spectroscopically in terms of intensity. From this, a size distribution of the light signals that is representative of a particle size distribution is produced. A known standard (Continued)

Figure 1:
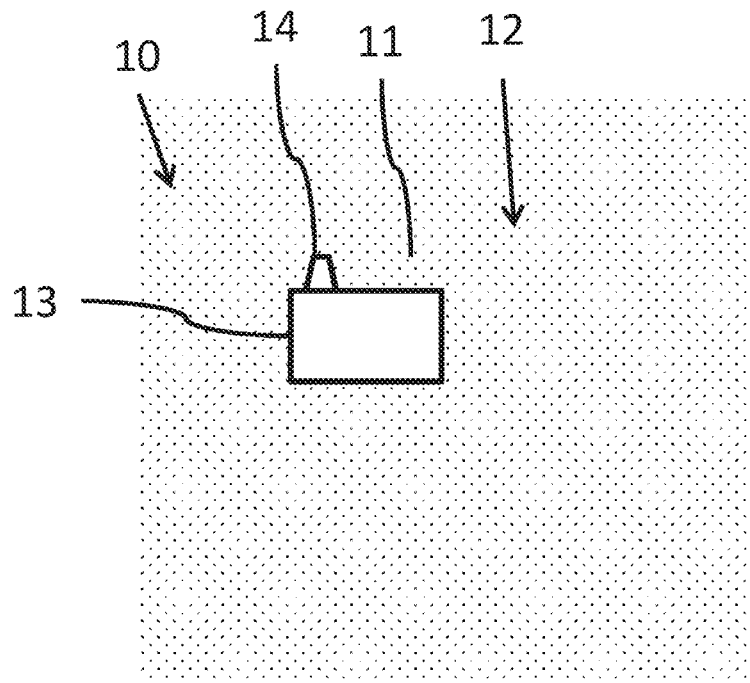
Figure 2:
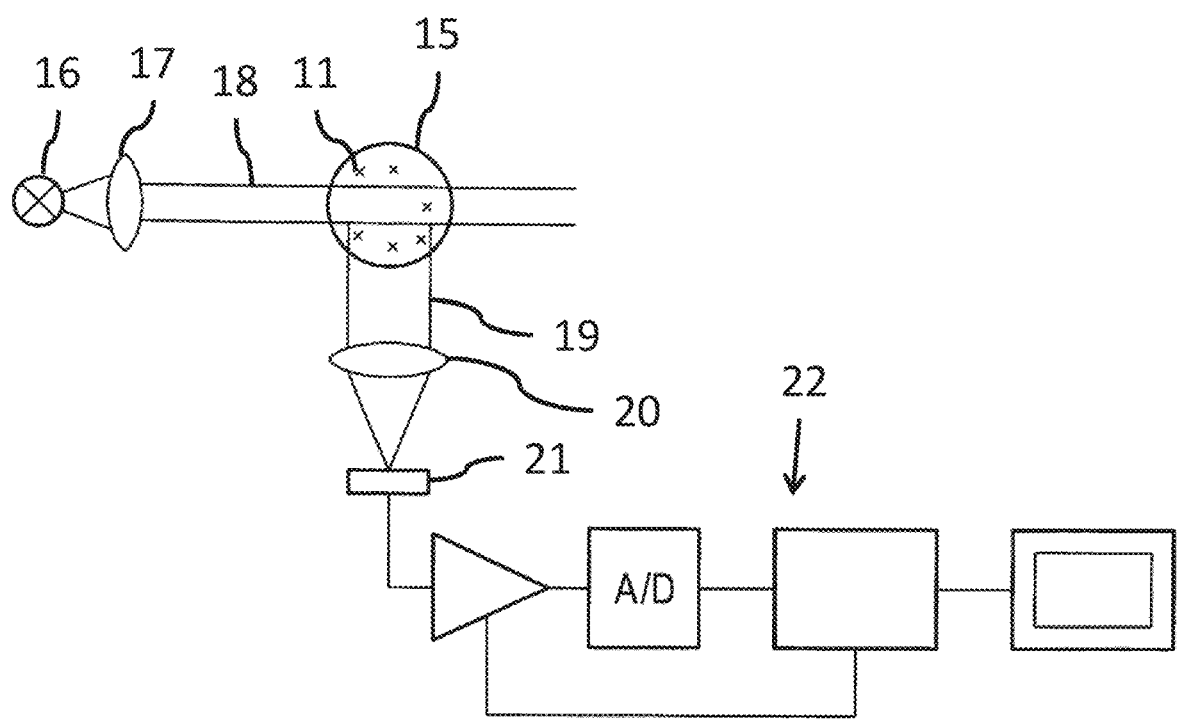

particle size distribution of dry aerosol particles is adapted to the measured particle size distribution, so that moisture influences are eliminated from the measured particle size distribution in this way.

17 Claims, 3 Drawing Sheets

(58) Field of Classification Search
CPC ... G01N 2015/0046; G01N 2015/1486; G01N 2015/003; G01N 2015/0238; G01N 21/53; G01N 21/85
USPC .......................... 356/335–343, 73, 432–440
See application file for complete search history.

(56) References Cited

U.S. PATENT DOCUMENTS

| | | |
|---|---|---|
| 7,619,734 B2 | 11/2009 | Chamberlin et al. |
| 8,705,036 B2 | 4/2014 | Peters |
| 9,581,494 B2 | 2/2017 | Weiß et al. |
| 2003/0016357 A1* | 1/2003 | Shofner ............. G01N 15/0211 356/337 |
| 2004/0144935 A1* | 7/2004 | Xu ..................... G01N 15/0211 250/573 |
| 2013/0060509 A1 | 3/2013 | Tsunoda |
| 2014/0092386 A1 | 4/2014 | Weiß et al. |
| 2018/0231448 A1 | 8/2018 | Moenkemoeller |
| 2018/0231449 A1 | 8/2018 | Moenkemoeller |
| 2023/0014672 A1* | 1/2023 | Weis ................... G01N 15/0205 |
| 2023/0021225 A1* | 1/2023 | Weiss ................. G01N 15/1459 |
| 2023/0024901 A1* | 1/2023 | Weiss ................. G01N 15/0211 |

FOREIGN PATENT DOCUMENTS

| | | |
|---|---|---|
| DE | 102009000904 A1 | 9/2009 |
| DE | 102010005962 A1 | 7/2011 |
| DE | 102012215830 A1 | 3/2013 |
| DE | 102017001438 A1 | 8/2018 |
| DE | 102017001439 A1 | 8/2018 |
| EP | 2717035 A2 | 4/2014 |
| IN | 201824004670 A | 8/2018 |
| JP | 2005221310 A | 8/2005 |
| WO | 92/21955 A1 | 12/1992 |

OTHER PUBLICATIONS

International Search Report, with English translation, issued in corresponding International Application No. PCT/EP2020/064419, date of mailing Oct. 14, 2020 (5 pages).
Written Opinion of International Searching Authority, issued in corresponding International Application No. PCT/EP2020/064419, date of mailing Oct. 14, 2020 (6 pages).
German Search Report issued in corresponding German Application No. 10 2019 003 704.9, date of mailing Mar. 12, 2020 (5 pages).
Chinese Office Action issued in corresponding Chinese Application No. 202080040059.7, date of mailing Apr. 29, 2024 (14 pages).

* cited by examiner

METHOD FOR DETERMINING THE PARTICLE SIZE DISTRIBUTION OF AN AEROSOL AND AEROSOL MEASURING DEVICE

The invention relates to a method for determining the particle size distribution of an aerosol by means of an aerosol measuring device, aerosol particles of the aerosol flowing through a measuring cell being illuminated in the measuring cell by a light beam, scattered light being picked up by a sensor and scattered light signals of the aerosol particles being detected spectroscopically in terms of intensity, and a size distribution of the scattered light signals that is representative of a particle size distribution being produced.

The invention also relates to an aerosol measuring device for determining the particle size distribution of an aerosol, aerosol particles of the aerosol being arranged in a measuring cell such that the aerosol particles can be illuminated by a light beam, scattered light of the aerosol particles being able to be picked up by a sensor and scattered light signals of the aerosol particles being detectable spectroscopically in terms of intensity, so that a size distribution of the scattered light signals that is representative of a particle size distribution can be produced.

Methods of the type in question are known from the prior art, by which a particle size distribution of aerosol particles of an aerosol is determined. Within the meaning of the invention, aerosol refers to a mixture of a gas with solid and/or liquid suspended particles (aerosol particles) such as water droplets, soot particles, abraded material, pollen, and other organic and chemical substances. The particle size distribution refers to the concentration of the aerosol particles depending on the particle size thereof and provides information about how often which particle sizes are present in the aerosol.

The current methods can be used to determine the fine dust load of the aerosol. However, all aerosol particles are always measured regardless of the particle type. The influence of one or more aerosol particle types often has a disturbing effect on the measurement results and can distort these, however. In particular, with the known methods, water particles and/or particles changed in size by water condensate also distort the measurement at high humidity, i.e. cause measurement errors.

The object of the invention is to overcome the advantages of the prior art and develop a more precise method and a device for determining the particle size distribution.

The method according to the invention is characterized in that a known standard particle size distribution of dry aerosol particles is adapted to the measured particle size distribution and moisture influences are eliminated from the measured particle size distribution in this way. The aerosol measuring device according to the invention is characterized in that a set-up of the aerosol measuring device is designed such that known standard particle size distribution of dry aerosol particles can be adapted to the measured particle size distribution and moisture influences can be eliminated from the measured particle size distribution in this way.

The invention is based on the basic concept that by adapting the standard particle size distribution, which has no or at most negligible moisture influences, to the measured particle size distribution, moisture influences can be largely eliminated and in this way, in particular, a reliable conclusion can be drawn as to the fine dust load of the aerosol to be measured.

Preferably, the adaptation of the standard particle size distribution to the measured particle size distribution is carried out only for the particle sizes within an adaptation interval. Particularly preferably, the adaptation interval has particle sizes with diameters of at most 3 μm. Functionally, the adaptation interval serves as a sampling point for the adaptation of the standard particle size distribution to the measured particle size distribution. In this region, the moisture influences on the particle size distribution are in particular negligible, which allows more precise adaptation.

In particular, values of the particle size distribution for particle sizes can be provided within a target size interval which preferably comprises particle diameters up to at most 50 μm, particularly preferably up to at most 20 and in particular up to 15 μm. This range usually has a significant moisture influence on the measured particle size distribution and is of interest for the assessment of the fine dust load of the aerosol.

Particularly preferably, the standard particle size distributions are determined from particle size distributions that have already been measured and that have been carried out in particular at the same location at which the method according to the invention is carried out. In order to compensate for the moisture influences on the measured particle size distribution, as described above, the particle size distributions already measured may have been measured at times when the concentration of water particles in the aerosol was negligible, i.e. in dry weather with low humidity, for example at a relative humidity of up to 60%.

Further preferably, the standard particle size distribution is a mathematically modelled particle size distribution which is in particular dependent on a potency γ of the particle diameter $d_p$, in particular the potency γ having a value between −10 and −0.1. In particular, the following applies: $c_n'=f(d_p^{\gamma})$. An example of such particle size distribution is known as Junge distribution, which describes the particle size distribution of an anhydrous aerosol as a model and which can be expressed mathematically by $$\frac{dc_n}{d\log r} = r^{-v}$$

where r corresponds to the particle radius, i.e. to half the particle diameter.

For example, the standard particle size distribution can be adapted to the measured particle size distribution in the adaptation interval, in particular by varying the parameters thereof. In mathematical terms, this is referred to as fitting. The adaptation takes place until an error parameter, for example the RMS (root mean square) error, is minimized. This leads to an adapted particle size distribution that is best fitted to the measured concentration distribution. The adapted particle size distribution can then be extrapolated for particle diameters within the target size interval.

A parameter can be calculated from the adapted particle size distribution, in particular in combination with the measured particle size distribution, which parameter corresponds to a mass fraction of the aerosol particles at the aerosol. Preferably, the parameter can correspond to a volume fraction of the aerosol particles. Particularly preferably, the $PM_{10}$ value can be calculated as such a parameter for the mass fraction. The $PM_{10}$ value corresponds to the proportion of aerosol particles having a diameter of less than 10 μm in the aerosol. These aerosol particles are inhalable. Correspondingly, the $PM_{2.5}$ value can be calculated, which corresponds to the proportion of aerosol particles having diameters of less than 2.5 μm. These particles are respirable. Finally, the $PM_{0.1}$ value can be calculated, which corresponds to ultrafine particles having diameters of less than 0.1 μm. By calculating the above-mentioned parameters for the mass fractions of specific aerosol particles on the basis of the particle size distribution for which moisture influences have been eliminated, more precise conclusions can in be particular be drawn as to the fine dust load of the aerosol.

Preferably, after the adaptation of the standard particle size distribution, the water particle content of the aerosol particles is determined from the adapted particle size distribution in combination with the measured particle size distribution. The water particle content can in particular be described mathematically by a moisture parameter which corresponds to the measure of the moisture influences on the measured particle size distribution. For example, the difference between the measured particle size distribution and the adapted particle size distribution can be determined as the moisture parameter, preferably only for particle sizes within the target size interval, from which difference the proportion of water condensate in the aerosol particles can be derived.

Preferably, after determining the water particle content of the aerosol particles, the elimination of the measured particle size distribution of moisture influences takes place only when the water particle content is greater than a predefined boundary value, which is in particular a boundary value for the moisture parameter. For example, such a boundary value for the water particle content in the aerosol particles is 0.1 μg/m³.

According to the invention, it may be provided that the target size interval overlaps the adaptation interval at least in part. Preferably, all the particle diameters of the target size interval are greater than the particle diameters of the adaptation interval.

Preferably, the aerosol measuring device has a set-up that is suitable for carrying out the above-mentioned method steps.

Further preferably, the light beam of the light source of the aerosol measuring device is polychromatic light, which, in contrast to monochromatic light, allows more precise determination of the particle size distribution. In another embodiment, the light beam comprises coherent light, in particular laser light. In order to detect the scattered light, the aerosol measuring device, in particular the detector thereof, can have at least four optical channels, which are designed as optical spectral channels, for example.

Further advantages and features can be found in the claims and in the following description, in which an embodiment of the invention is explained in detail with reference to the drawings, in which:

FIG. 1 is a schematic illustration of an aerosol measuring device in an aerosol to be measured;

FIG. 2 shows a schematic structure of the aerosol measuring device of FIG. 1;

FIG. 3 is a flow diagram of the method according to the invention and

FIG. 4 to 6 show measured and adapted particle size distributions for different aerosols.

FIG. 1 is a schematic illustration of an aerosol 10 which contains solid and liquid aerosol particles 11 in a gas 12, for example air. Aerosol particles 11 are, for example, water droplets, soot particles, abraded material, pollen, and/or other organic and chemical substances.

An aerosol measuring device 13 in the form of an aerosol spectrometer is arranged in the region of the aerosol 10, which aerosol measuring device measures a particle size distribution of the aerosol particles 11 of the aerosol 10 depending on the particle diameters $d_p$ thereof. For this purpose, the aerosol particles 11 are sucked through via an access opening 14 of the aerosol measuring device 13 and via a flow tube 15 by means of a pump (not shown) arranged downstream. In the sketched structure of the aerosol measuring device 13 according to FIG. 2, the flow tube 15 is arranged perpendicularly to the drawing plane.

The aerosol particles 11 are illuminated in the flow tube 15 perpendicularly to the flight direction thereof with a collimated light beam 18 of polychromatic light from a light source 16 and a lens 17. Due to the scattering processes taking place as a result, the aerosol particles 11 emit scattered light 19, which arrives at a convergent lens 20 perpendicularly to the flight direction of the aerosol particles 11 and perpendicularly to the illumination direction of the light from the light source 16. The convergent lens 20 focuses the scattered light 19 onto an optoelectronic sensor 21, which converts the scattered light 19 into electrical signals. An electronic processing unit 22 determines the particle size distribution $c_n$ from the electrical signals depending on the particle diameters $d_p$ of the aerosol particles 11. The spatial overlap of the light beam 18, the measured scattered light 19 and the detected part of the aerosol particles 11 in the flow tube 15 defines a virtual spatial measuring cell 23 in which the particle size distribution is determined.

In the measurement, the light intensity of the scattered light 19 and thus also the electrical signal strength caused thereby is a measure for the particle size of the aerosol particles 11, which particle size is accordingly assigned a particle diameter $d_p$. The measured particle size distribution $c_n$ is dependent on the particle diameter $d_p$, so that $c_n=f(d_p)$.

Although in the measurements the particle size distribution $c_n$ is always determined as measuring points for discrete particle diameters $d_p$, usually using up to 256 channels, the course of the measured particle size distribution $c_n$ between the measuring points in the evaluation is interpolated in the electronic processing unit 22 such that a continuous course is produced, as shown in FIG. 4 to 6. There, the measured particle size distributions $c_n$ are plotted as fine dotted curves against the particle diameter $d_p$ including a region $e_1$ which reflects the moisture influences. FIG. 4 to 6 also show standard particle size distributions $c_n'$ of dry aerosol particles 11, i.e. without moisture influences. It can be seen that the moisture influences on the particle size distribution $c_n$ are negligible within an adaptation interval $\Delta d_2$ (described further below) for particle diameters $d_p$ between 0.2 μm and at most 3 μm. In contrast, in a target size interval $\Delta d_1$, also described below, which has particle diameters $d_p$ of 3 μm to 50 μm, the moisture influences on the particle size distribution $c_n$ are considerable, although, for reasons of clarity, FIG. 4 to 6 show only the course for particle diameters $d_p$ between 0.2 μm and 20 μm in a double logarithmic scale. It can therefore be concluded that water particles of the aerosol 10 are predominantly in the target size interval $\Delta d_1$ in terms of size.

In the following, the method according to the invention is described with reference to FIG. 3. In a first method step A, the particle size distribution $c_n$ is determined by means of the aerosol measuring device 13 in the manner already described. The particle size distribution $c_n$ has moisture influences, as is also shown in FIG. 4 to 6.

In a second method step B, an already existing, parameterizable standard particle size distribution $c_n'$ for dry particles, i.e. with negligible moisture influences, is adapted to the measured particle size distribution $c_n$, which is referred to as fitting in mathematical terms. The standard particle size distribution $c_n'$ is dependent on at least one fitting parameter $\alpha_i$, which is varied until there is sufficient conformity of the standard particle size distribution $c_n'$ with the measured concentration distribution $c_n$. In this case, the adaptation takes place exclusively for sampling points of the particle diameters $d_p$ in the adaptation interval $\Delta d_2$, i.e. between 0.1 μm and 3 μm. The discrete sampling points are shown as squares in FIG. 4 to 6.

As a standard particle size distribution $c_n'$, a Junge distribution is used for dry aerosols 10, which distribution has no moisture influences and is described as follows:

$$\frac{dc_n}{d\log r} = r^{-\nu}$$

where r is the radius of the aerosol particles 11, so that $r=d_p/2$. The standard particle size distribution $c_n'$ is therefore dependent on the potency ν of the particle diameter $d_p$, where ν has values between −10 and −0.1 and therefore acts as the fitting parameter $\alpha_i$. Alternatively, predefined and/or already stored, measured standard particle size distribution $c_n'$ can also be used, but these must not have any significant moisture influences.

In order to assess a sufficiently good adaptation, an error parameter β is calculated for the quality of the fitting, which parameter is minimized for an optimal adaptation. Such an error parameter β is, for example, the RMS value, which is defined as the mean of the square deviation of the standard particle size distribution $c_n'$ from the measured particle size distribution (root mean square). In the result, a standard particle size distribution $c_n'$ is obtained which is best adapted to the measured particle size distribution $c_n'$ for particle diameters $d_p$ in the adaptation interval $\Delta d_2$. This curve is approximated to the measured particle size distribution $c_n$ in each of FIG. 4 to 6 and is shown as a solid line in each case, although instead of the region $e_1$ it has a region $e_2$ which does not reflect any significant moisture influences.

In a following method step C, the moisture influences on the measured particle size distribution $c_n$ are determined in the form of a moisture parameter γ, where the moisture parameter γ is defined as the deviation of the adapted standard particle size distribution $c_n'$ of the measured particle size distribution $c_n$ for particle diameters $d_p$ in the target size interval $\Delta d_1$. The moisture parameter γ is therefore a measure of the area between the region $e_1$ and the region $e_2$ of FIG. 4 and reflects the proportion of water condensate particles in the aerosol particles 11.

After the moisture parameter γ has been detected, in a following method step D a query is made as to whether the moisture parameter γ is greater than a predefined boundary value $\gamma_{GW}$, where in particular $\gamma_{GW}=0.001$ water condensate particles/cm³.

Figure 3:
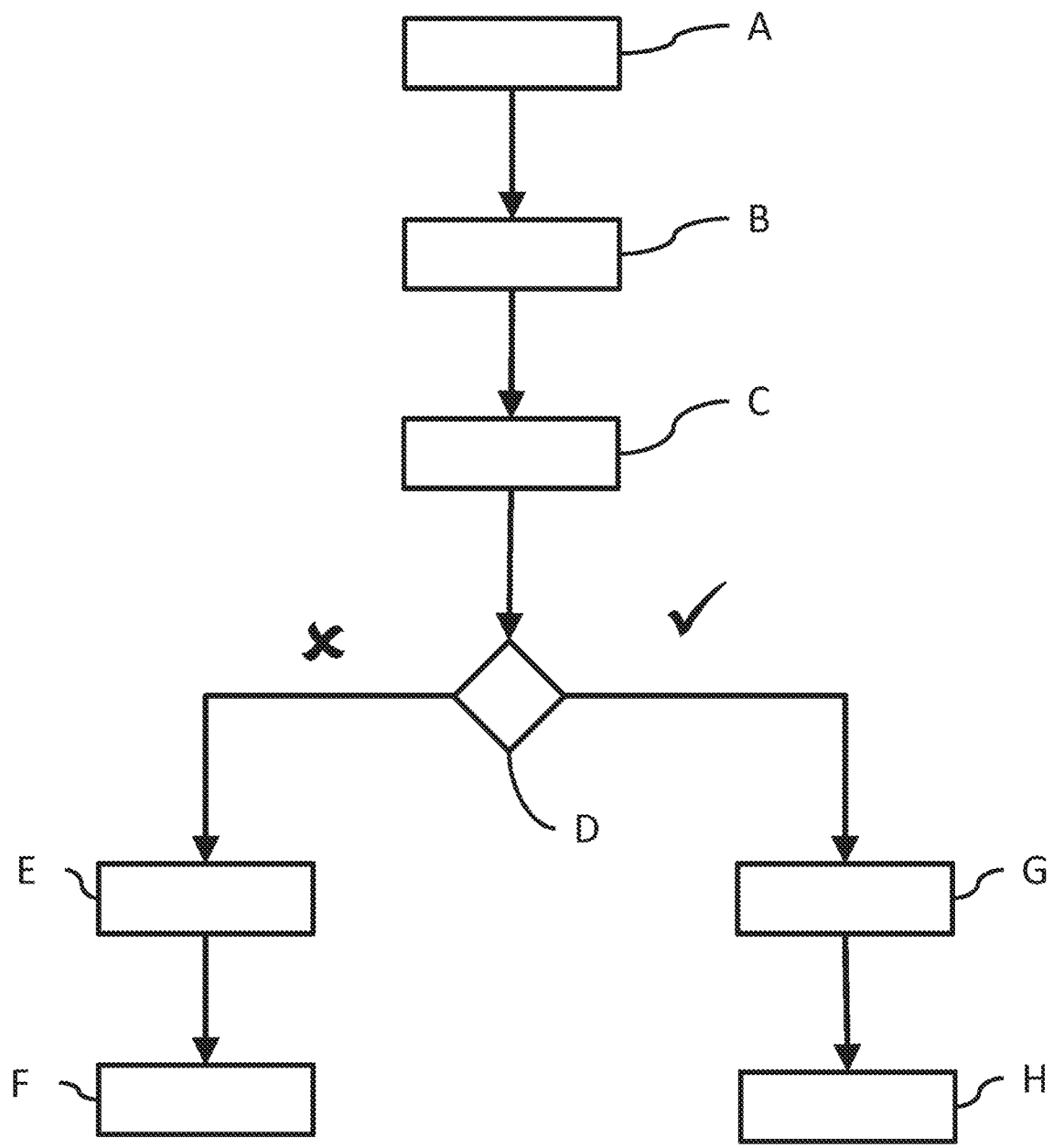
Figure 4:
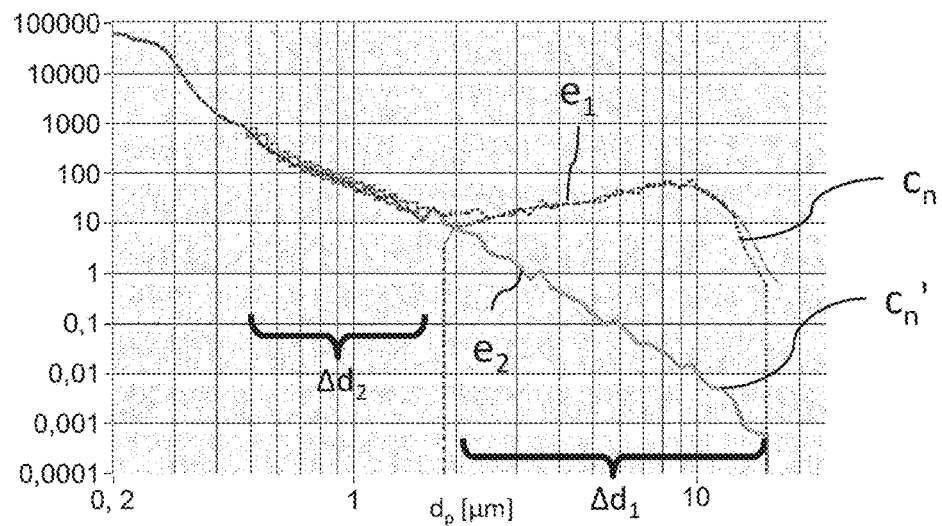
Figure 5:
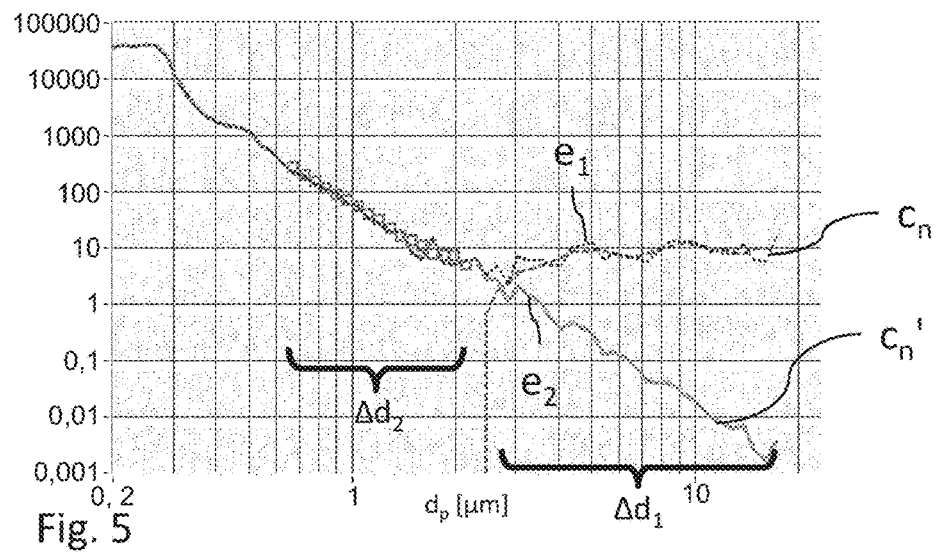
Figure 6:
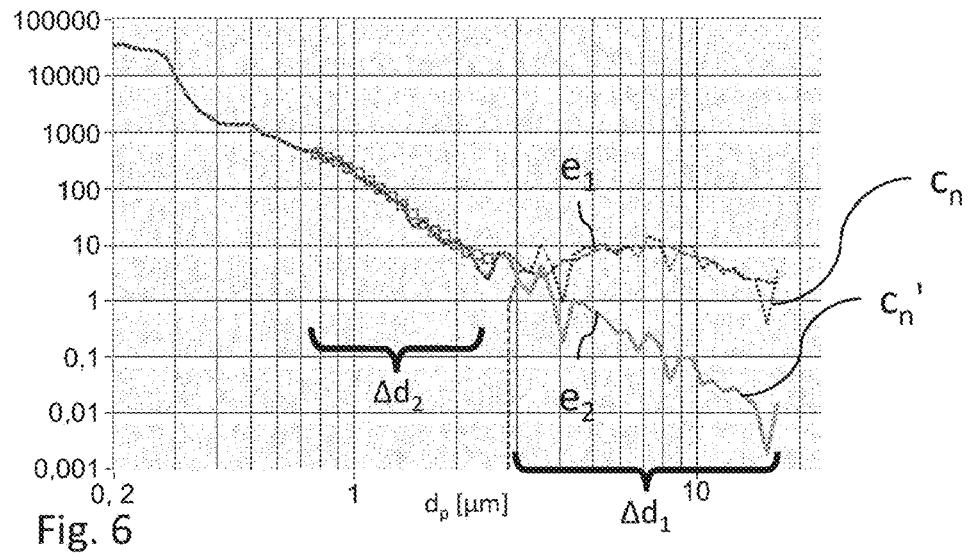

If the moisture parameter γ is smaller than the boundary value $\gamma_{GW}$, there is only one negligible moisture influence on the measured particle size distribution $c_n$. In this case, the regions $e_1$ and $e_2$ of FIG. 4 to 6 are approximately congruent and the process continues with a following method step E, which is shown on the left side in FIG. 3. The values of the measured particle size distribution $c_n$ for particle diameters $d_p$ of the first size interval $\Delta d_1$ are thus provided.

A parameter is then calculated from the measured particle size distribution $c_n$ in a method step F, which parameter corresponds to a specific mass fraction of the aerosol particles 11. This is for example the $PM_{2.5}$ value, which reflects the mass fraction of all aerosol particles 11 with particle diameters $d_p$ of less than 2.5 μm in the total aerosol 10 and is a measure for the fine dust load of the aerosol 10.

If the query according to method step D reveals that the moisture parameter γ is greater than the boundary value $\gamma_{GW}$, there is a significant moisture influence on the measured particle size distribution $c_n$. This case is shown in each of FIG. 4 to 6. In this case, the process continues with a following method step G, which is shown on the right side in FIG. 3. There, the adapted standard particle size distribution $c_n'$ for particle diameters $d_p$ of the first size interval $\Delta d_1$ is provided by extrapolation, the values of which are not subject to moisture influences. In this way, the moisture influences were eliminated. In FIG. 4 to 6, a model course of the particle size distribution for the water particles of the aerosol is shown as a dashed line, which is approximately congruent with the respective measured particle size distributions $c_n$ in FIG. 4 to 6 in the region of the first size interval $\Delta d_1$.

Finally, in a final method step, the $PM_{2.5}$ value described already is determined from the standard particle size distribution $c_n'$. Moisture influences are therefore also eliminated from the $PM_{2.5}$ value. The pure fine dust load of the aerosol 10 can therefore be reliably determined despite any water particles present.

The invention claimed is:

1. A method for determining a particle size distribution ($c_n$) of an aerosol by an aerosol measuring device, the method comprising: flowing aerosol particles of the aerosol through a measuring cell being illuminated in the measuring cell by a light beam, picking up scattered light by a sensor and detecting scattered light signals of the aerosol particles spectroscopically in terms of intensity, and producing a size distribution of the scattered light signals that is representative of the particle size distribution ($c_n$) being produced, wherein a known standard particle size distribution ($c_n'$) of dry aerosol particles is fitted to the measured particle size distribution and in this way moisture influences are eliminated from the measured particle size distribution ($c_n$); wherein the standard particle size distribution ($c_n'$) is a mathematically modelled particle size distribution which is dependent on a potency (ν) of a particle diameter ($d_p$), the potency (ν) having a value between −10 and −0.1 and the standard particle size distribution ($c_n'$) being described by $$\frac{dc_n}{d\log r} = r^{-\nu},$$

where ν has a value between −10 and −0.1 and r is a particle radius.

2. The method according to claim 1, wherein fitting of the standard particle size distribution ($c_n'$) to the measured particle size distribution ($c_n$) is carried out only for particle sizes within a fitting interval ($\Delta d_2$).

3. The method according to claim 2, wherein the fitting interval ($\Delta d_2$) comprises particle sizes having diameters ($d_p$) of up to a maximum of 3 μm.

4. The method according to claim 2, wherein the standard particle size distribution ($c_n'$) is determined from particle size distributions ($c_n$) that have already been measured.

5. The method according to claim 2, wherein a parameter is calculated from the fitted particle size distribution ($c_n'$) in combination with the measured particle size distribution ($c_n$), which parameter corresponds to a mass fraction of the aerosol particles at the aerosol.

6. The method according to claim 2, wherein after the fitting of the standard particle size distribution ($c_n'$), a water particle content of the aerosol particles is determined from the fitted particle size distribution ($c_n'$) in combination with the measured particle size distribution ($c_n$).

7. The method according to claim 1, wherein the standard particle size distribution ($c_n'$) is determined from particle size distributions ($c_n$) that have already been measured.

8. The method according to claim 7, wherein a parameter is calculated from the fitted particle size distribution ($c_n'$) in combination with the measured particle size distribution ($c_n$), which parameter corresponds to a mass fraction of the aerosol particles at the aerosol.

9. The method according to claim 1, wherein a parameter is calculated from the fitted particle size distribution ($c_n'$) in combination with the measured particle size distribution ($c_n$), which parameter corresponds to a mass fraction of the aerosol particles at the aerosol.

10. The method according to claim 1, wherein after the fitting of the standard particle size distribution ($c_n'$), a water particle content of the aerosol particles is determined from the fitted particle size distribution ($c_n'$) in combination with the measured particle size distribution ($c_n$).

11. A method for determining a particle size distribution ($c_n$) of an aerosol by an aerosol measuring device, the method comprising: flowing aerosol particles of the aerosol through a measuring cell being illuminated in the measuring cell by a light beam, picking up scattered light by a sensor and detecting scattered light signals of the aerosol particles spectroscopically in terms of intensity, and producing a size distribution of the scattered light signals that is representative of the particle size distribution ($c_n$) being produced, wherein a known standard particle size distribution ($c_n'$) of dry aerosol particles is fitted to the measured particle size distribution and in this way moisture influences are eliminated from the measured particle size distribution ($c_n$); wherein after the fitting of the standard particle size distribution ($c_n'$), a water particle content of the aerosol particles is determined from the fitted particle size distribution ($c_n'$) in combination with the measured particle size distribution ($c_n$); and wherein after determining the water particle content of the aerosol particles, the elimination of the measured particle size distribution ($c_n$) of moisture influences takes place only when the water particle content is greater than a predefined boundary value ($\gamma_{GW}$).

12. An aerosol measuring device for determining particle size distribution ($c_n$) of an aerosol, the measuring device comprising a measuring cell with aerosol particles of the aerosol being arranged in the measuring cell such that the aerosol particles can be illuminated by a light beam, a sensor picking up scattered light of the aerosol particles and scattered light signals of the aerosol particles being detectable spectroscopically in terms of intensity, so that a size distribution of the scattered light signals that is representative of a particle size distribution ($c_n$) can be produced, wherein a set-up of the aerosol measuring device is designed such that a known standard particle size distribution ($c_n'$) of dry aerosol particles can be fitted to the measured particle size distribution ($c_n$) and in this way moisture influences can be eliminated from the measured particle size distribution ($c_n$), wherein after the fitting of the standard particle size distribution ($c_n'$), a water particle content of the aerosol particles is determined from the fitted particle size distribution ($c_n'$) in combination with the measured particle size distribution ($c_n$); and wherein after determining the water particle content of the aerosol particles, the elimination of the measured particle size distribution ($c_n$) of moisture influences takes place only when the water particle content is greater than a predefined boundary value ($\gamma_{GW}$).

13. The aerosol measuring device according to claim 12, wherein the aerosol measuring device has a set-up that is suitable for carrying out a method for determining a particle size distribution ($c_n$) of an aerosol by an aerosol measuring device, the method comprising: flowing aerosol particles of the aerosol through a measuring cell being illuminated in the measuring cell by the light beam, picking up scattered light by the sensor and detecting scattered light signals of the aerosol particles spectroscopically in terms of intensity, and producing the size distribution of the scattered light signals that is representative of the particle size distribution ($c_n$) being produced, wherein the known standard particle size distribution ($c_n'$) of dry aerosol particles is fitted to the measured particle size distribution and in this way moisture influences are eliminated from the measured particle size distribution ($c_n$).

14. The aerosol measuring device according to claim 12, wherein the light beam of a light source is polychromatic light.

15. The aerosol measuring device according to claim 12, wherein the light beam of a light source is coherent light.

16. A non-transitory computer program comprising instructions that cause the aerosol measuring device according to claim 12 to carry out a method for determining a particle size distribution ($c_n$) of an aerosol by an aerosol measuring device, the method comprising: flowing aerosol particles of the aerosol through a measuring cell being illuminated in the measuring cell by the light beam, picking up scattered light by the sensor and detecting scattered light signals of the aerosol particles spectroscopically in terms of intensity, and producing the size distribution of the scattered light signals that is representative of the particle size distribution ($C_n$) being produced, wherein the known standard particle size distribution ($c_n'$) of dry aerosol particles is fitted to the measured particle size distribution and in this way moisture influences are eliminated from the measured particle size distribution ($c_n$).

17. A non-transitory computer-readable medium on which the computer program according to claim 16 is stored.

* * * * *